July 23, 1968   J. A. VAN DEN BROEK   3,393,959
LIGHT APERTURE CONSTRUCTION
Filed June 6, 1963   2 Sheets-Sheet 1
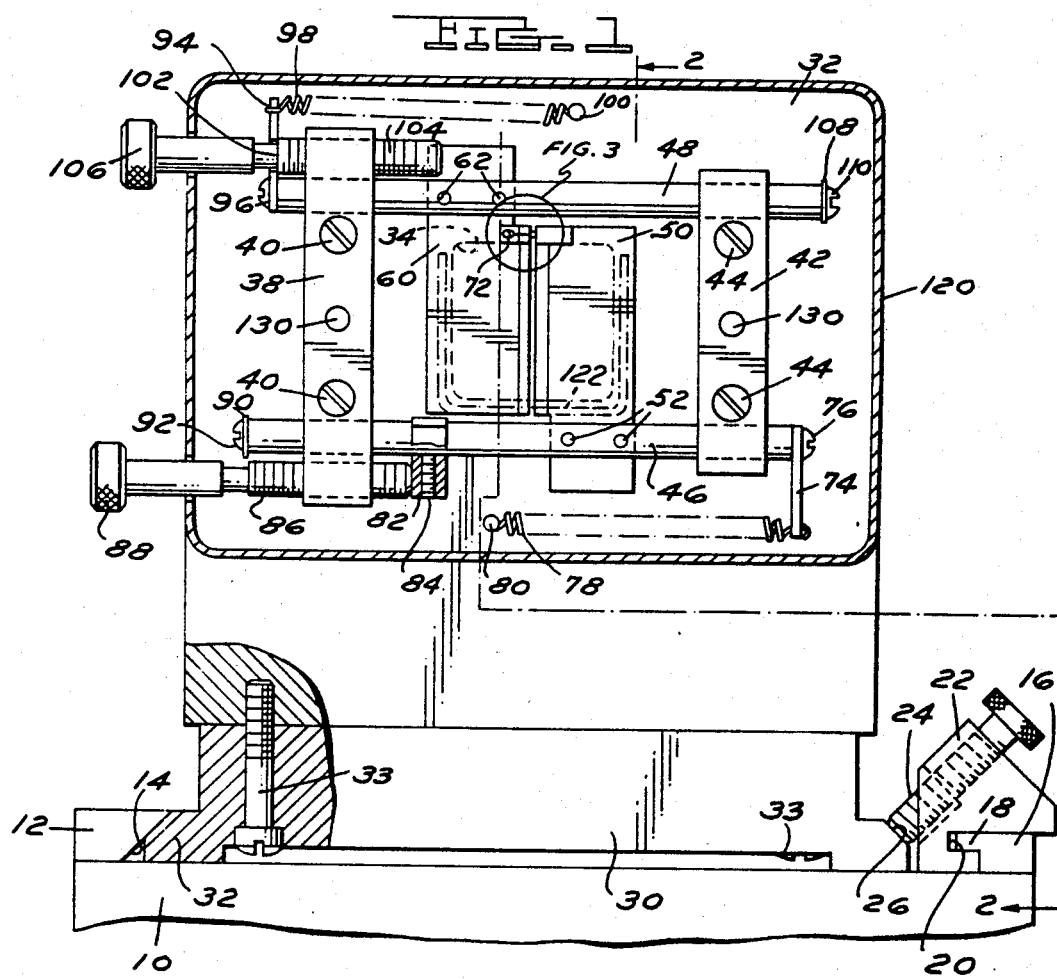
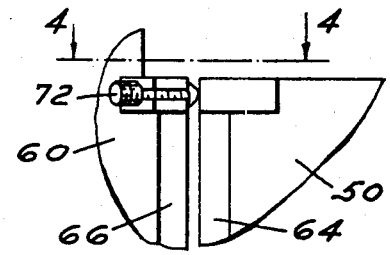
INVENTOR.
JAN A VAN DEN BROEK
BY
Barnes, Kisselle, Raisch & Choate
ATTORNEYS July 23, 1968  J. A. VAN DEN BROEK  3,393,959
LIGHT APERTURE CONSTRUCTION
Filed June 6, 1963  2 Sheets-Sheet 2
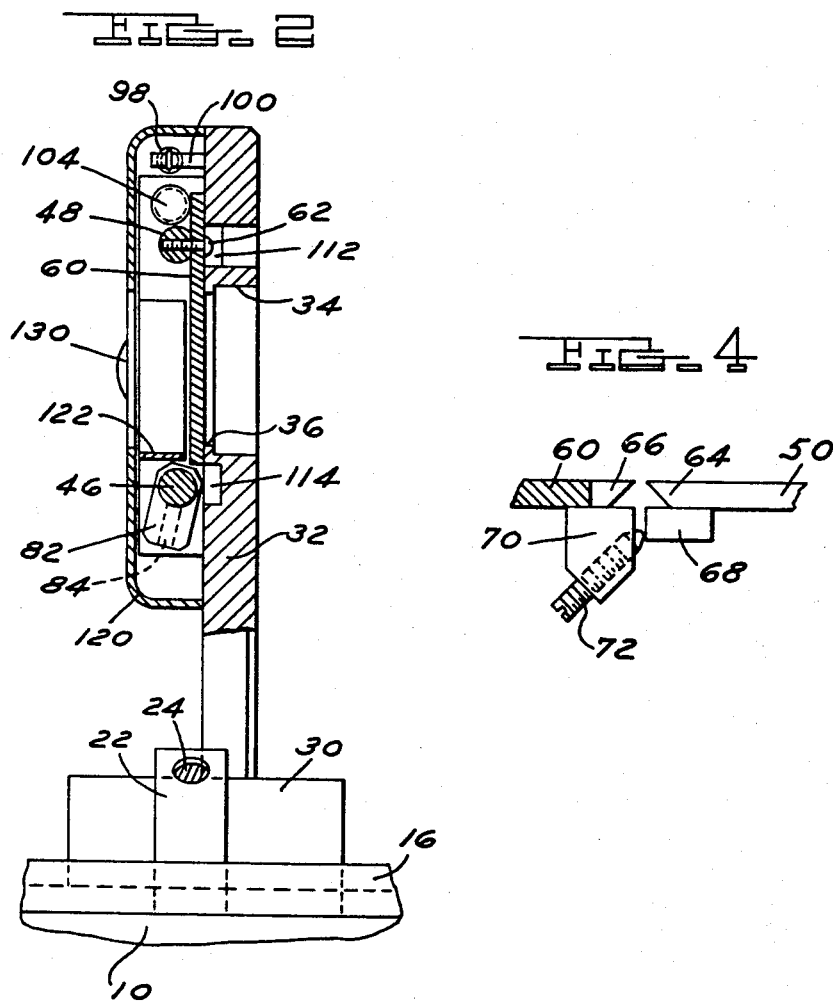
INVENTOR.
JAN A. VAN DEN BROEK
BY
Barness, Kisselle, Raisch & Choate
ATTORNEYS

United States Patent Office 3,393,959
Patented July 23, 1968

3,393,959
LIGHT APERTURE CONSTRUCTION
Jan A. Van den Broek, Ann Arbor, Mich., assignor to Conductron Corporation, Ann Arbor, Mich., a corporation of Delaware
Filed June 6, 1963, Ser. No. 286,026
6 Claims. (Cl. 350—271)

This invention relates to a Light Aperture Construction and more particularly to a device for forming a light slit for use in a ray pattern of an optical computer or correlator.

In a computer using an optical system with a source of light and into which information is introduced, it is generally desired to reduce the light rays in the system to some finite width such as a coarse or fine line. This is accomplished by using a light slit having opaque jaws with thin edges, thus forming occluders for light except that desirable to have transmitted. It is desirable to have an accurate but flexibly adjustable mounting whereby both the width and position of the light transmitted by the slit are selectable by convenient adjustment of the slit jaws. This permits the slit to be enlarged or contracted and also translated with an extremely fine control. In such an optical computer system the slit performs the function of a spatial filter which may be used to transmit a desired portion of a diffraction pattern.

It is an object of the present invention to provide a slit construction and mount which provides the above desirable features.

It is a further object to provide a mount which is simple in construction and resiliently biased against vibratory disturbance and so arranged that the manual adjustment is resistant to a resilient and thus controlled biasing of the delicate parts toward each other. Thus, there can be no manual jamming of the parts.

Other objects and features of the invention relating to details of construction and operation will be apparent in the following description and claims.

Drawings accompany the disclosure and the various views thereof may be briefly described as:
FIGURE 1, a vertical view partially in section showing the relationship of the parts of the apparatus.
FIGURE 2, a sectional view on line 2—2 of FIGURE 1.
FIGURE 3, an enlargement of a portion of FIGURE 1 to show detail.
FIGURE 4, a sectional view on line 4—4 of FIGURE 3.

Referring to the drawings: A base mount beam 10 is shown in FIGURE 1 having a rail 12 provided with a chamfered edge to form a re-entrant groove 14. On the other side of the beam is a rail 16 having a flange projection 18 which engages in a groove 20 of a locating block 22. It will be seen that the block is locked in position by this interengagement and a set screw 24 is positioned at an angle to lock against a surface 26 on the foot of a base block 30. At the other side of the base block is a foot portion 32 having a surface to engage with the re-entrant groove 14.

As shown in FIGURE 2, the base block 30 is relatively wide to provide stability for the device on the mounting beam 10. Projecting vertically upward from the block 30 is a fairly thick plate 32 mounted by screws 33 rigidly to the block. This plate has an opening 34 centrally thereof and substantially square, this opening narrowing down at 36. On the face of plate 32, as shown in FIGURE 1, is a bar 38 held to the plate by screws 40, this bar serving as a supporting and adjusting bracket in a manner to be described.

Parallel to this bar 38 and on the opposite side of the opening 34 is a second shorter bar 42 held on plate 32 by screws 44. These bars 38 and 42 are drilled to provide opposed guide holes which support rods 46 and 48 extending therethrough in sliding relationship. These rods serve as blade supports. On rod 46 a blade 50 is supported, this blade extending upwardly over the aperture opening 34, it being rigidly secured by screws 52 to the rod 46. On rod 48 is a blade 60 secured thereto by screws 62.

As shown in the sectional view of FIGURE 4, each blade 50 and 60 has a projecting portion 64 and 66 with a knife edge at one surface so that an extremely sharp slit can be formed between these blades as they move toward each other. In order to provide extremely minute adjustment between the blades and also to prevent the sharp edges from contacting, stop blocks 68 and 70 are cemented to the blades using an epoxy resin adhesive.

The block 70 has a cone-pointed screw 72 threaded therein to project outwardly to contact the block 68. This will prevent any contact between the facing sharp edges of the blades which must not touch at any time. The blades are movable with the supporting rods 46 and 48 but are also biased in their positions. On the end of rod 46 is a finger 74 fastened on to the end of the rod by a screw 76. This finger has attached to its digital end a tension spring 78 anchored by a screw 80 to the block 32. A stop piece 82 is also affixed to the rod 46 by a set screw 84. This stop piece co-operates with the end of a screw 86 threaded through the bar 38. This screw is manipulated by a knurled extension 88. A washer 90 held on to the rod 46 by a screw 92 locks the rod 46 into the support bars.

Rod 48 has on its left end, as viewed in FIGURE 1, a finger 94 held securely in position by a screw 96, this finger serving as an anchor for a tension sring 98 fastened at its other end by a screw 100 on block 32. This spring tends to urge the rod 48 to the right, this motion being controlled by finger 94 transfixed by and engaging a shoulder 102 on a screw 104 which is threaded through the bar 38 and again controlled by a knurled extension 106. A washer 108 is also affixed by a screw 110 to the right end of rod 48. Suitable openings 112 and 114 are provided in order to clear the heads of screws 52 and 62 so that the blades 50 and 60 can lie flat against the back side of the plate 32.

A guard shield 120 is formed to overlie the parts above described on the one face of plate 32, this shield carrying a U-shaped secondary shield element 122 which projects toward but not into contact with the blades 50 and 60. The guard shield 120 has a rectangular opening lying within the confines of the U-shaped element 122 aligned with the openings 34 of plate 32. The guard shield is suitably apertured to accommodate the control extensions 88 and 106.

It will thus be seen that the plate 32 can be rigidly secured to the supporting beam 10 through block 30 and that the slit blades 50 and 60 are slidably mounted against this plate and resiliently held against motion in one direction. This motion is accomplished by the screws 88 and 104 which can move the supporting rods 46 and 48 against the biasing springs. The screw 72 prevents contact of the knife edges of the blades 50 and 60 but extremely fine control of the slit between these blades is possible by reason of the spring bias and screw control so that the width of the slit formed by the blades can be very finely adjusted and the slit itself can be moved to the right or to the left if desired by co-ordinate manipulation of the screws 86 and 104.

The construction is such that the slit plates are moved toward each other only by the springs 78, 98. The controlling screws 86 and 104 can only move the plates in one direction and that is away from each other. Thus, the plates cannot be manually jammed by inexpert manipulation of the control screws. The guard shields 120 and 122, held in place by screws 130, keep the operating parts as free from dust and dirt as possible without interfering with the operation of the moving parts.

It will be noted also that the edges of the slits are so mounted that the parallelism between them is not disturbed by motion of one or both of them.

I claim:

1. A mechanism for creating a light slit for an optical device which comprises:
   (a) a support means,
   (b) a pair of slit blades slidably mounted on said support means for unidirectional movement in substantially the same plane and positioned to present facing edges.
   (c) resilient means biasing said blades such that said edges are urged toward each other, and
   (d) manually controllable means selectively operable on each of said blades to move positively each of said blades away from the other in opposition to the force of said biasing means and to control the movement of said blades toward each other, whereby to permit accurate adjustment of said blades relative to each other to create a light slit and to permit shifting of both blades relative to said support means to position said slit in a selected position transversely of the facing edges.

2. A mechanism for creating a light slit for an optical device which comprises:
   (a) a support means,
   (b) a pair of slit blades to be mounted in an aligned and adjacent position in the same plane for unidirectional motion in said plane,
   (c) means on said support means to slidably mount said blades comprising spaced bars having opposed openings therein,
   (d) parallel rods extending through the openings in said bars for a straight sliding movement,
   (e) means for biasing said rods in opposite directions,
   (f) means for moving said rods against said bias in a fine adjustment and for controlling the movement of said rods in the direction of the bias, and
   (g) means supporting one of said blades on one of said rods and the other of said blades on the other of said rods wherein adjacent edges of said blades may be brought into fine edgewise adjustment relative to each other in any of an infinite number of positions within a defined area on said support means.

3. A device as defined in claim 2 in which an adjustable stop means is provided on said blades comprising means on each of said blades positioned adjacent the adjacent edges to prevent contact of the said edges of said blades.

4. A device as defined in claim 2 in which a shield member overlies said one side of said support means and the mounting means of said blades, said shield member having an aperture to permit the passage of light through a gap between said blades, and a secondary shield means on said shield member extending axially of said aperture between said blades and said aperture.

5. A device as defined in claim 2 in which the means for moving said rods comprises threaded elongate means in one of said mounting bars adapted to contact finger projections on said rods to move said rods positively in a direction opposite to the bias thereon.

6. A device for creating a rectangular aperture in an optical instrument, said aperture having two opposed boundaries which are individually adjustable as to position without disturbing the parallel relationship between them which comprises:
   (a) a mounting plate having a relatively large aperture therein,
   (b) parallel guide blocks disposed on opposite sides of said aperture,
   (c) a pair of parallel rods disposed normal to said guide blocks and on opposite sides of said aperture and having a free sliding engagement with said blocks in a direction parallel to said mounting plate,
   (d) a pair of aperture limiting blades having opposed sharp edges overlying said aperture, each of said blades being mounted in face to face contact with said mounting plate on one of said rods wherein said edges are facing and parallel,
   (e) means biasing each of said blades in a direction toward each other, and
   (f) adjusting means positioned to move each of said rods positively only in a direction to shift said blades away from each other against said bias and to control the movement of said blades toward each other under the force of said biasing means.

References Cited

UNITED STATES PATENTS 3,211,056  10/1965  Goldstein et al. _____ 350—271

JEWELL H. PEDERSEN, *Primary Examiner.*

W. L. SIKES, *Assistant Examiner.*